(12) United States Patent
Savonen et al.

(10) Patent No.: US 6,422,219 B1
(45) Date of Patent: Jul. 23, 2002

(54) ELECTRONIC CONTROLLED ENGINE EXHAUST TREATMENT SYSTEM TO REDUCE $NO_X$ EMISSIONS

(75) Inventors: Craig Savonen, Carleton; Phillip F. Rimnac, Saline; Richard M. Avery, Jr., West Bloomfield, all of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/724,435

(22) Filed: Nov. 28, 2000

(51) Int. Cl.[7] .............................................. F02M 25/07
(52) U.S. Cl. ........................... 123/568.12; 123/568.21; 60/602; 60/605.2
(58) Field of Search ...................... 123/568.11, 568.12, 123/568.21; 60/602, 605.2

(56) References Cited

U.S. PATENT DOCUMENTS

| | | |
|---|---|---|
| 1,833,611 A | 11/1931 | Kirgan |
| 2,433,397 A | 12/1947 | Rhoades |
| 3,712,281 A | 1/1973 | Ruth |
| 3,714,932 A | 2/1973 | Meacham et al. |
| 3,807,374 A | 4/1974 | Marsee |
| 3,817,221 A | 6/1974 | Nohira et al. |
| 3,831,377 A | 8/1974 | Morin |
| 4,009,695 A | 3/1977 | Ule |
| 4,011,845 A | 3/1977 | Mayer et al. |
| 4,105,065 A | 8/1978 | Chirico |
| 4,114,370 A | 9/1978 | Woods |
| 4,137,879 A | 2/1979 | Kageyama et al. |
| 4,147,141 A | 4/1979 | Nagano |
| 4,168,683 A | 9/1979 | Hata et al. |
| 4,291,760 A | 9/1981 | Argvie et al. |
| 4,294,220 A | 10/1981 | Yasuhara et al. |
| 4,323,045 A | 4/1982 | Yamashita |
| 4,373,498 A * | 2/1983 | Ushimura .............. 123/568.21 |
| 4,388,912 A | 6/1983 | Kimura et al. |
| 4,426,848 A | 1/1984 | Stachowicz |
| 4,449,502 A | 5/1984 | Furuhashi |
| 4,449,505 A | 5/1984 | Tezuka et al. |
| 4,495,929 A | 1/1985 | Maeda et al. |
| 4,608,955 A | 9/1986 | Ohktaki et al. |
| 4,632,178 A | 12/1986 | Hirano |
| 4,635,609 A | 1/1987 | Seppen et al. |
| 4,762,109 A | 8/1988 | Jeenicke |
| 4,774,858 A | 10/1988 | Ganoung |
| 4,956,973 A | 9/1990 | Fortnagel et al. |
| 4,964,318 A | 10/1990 | Ganoung |
| 4,972,903 A | 11/1990 | Kwok |
| 5,138,835 A | 8/1992 | Bender et al. |
| 5,154,599 A | 10/1992 | Wunning |
| 5,203,311 A | 4/1993 | Hitomi et al. |
| 5,241,940 A | 9/1993 | Gates, Jr. |
| 5,349,936 A | 9/1994 | Uchinami |
| 5,426,936 A | 6/1995 | Levendis et al. |
| 5,440,880 A | 8/1995 | Ceynow et al. |
| 5,490,488 A | 2/1996 | Aversa et al. |
| 5,501,714 A | 3/1996 | Valentine et al. |
| 5,517,976 A | 5/1996 | Bachle et al. |
| 5,537,974 A | 7/1996 | Palmer |
| 5,546,915 A | 8/1996 | Isobe |
| 5,584,894 A | 12/1996 | Peter-Hoblyn et al. |
| 5,607,010 A | 3/1997 | Shonfeld et al. |
| 5,617,726 A | 4/1997 | Sheridan et al. |
| 5,669,365 A | 9/1997 | Gartner et al. |

(List continued on next page.)

*Primary Examiner*—Willis R. Wolfe
(74) *Attorney, Agent, or Firm*—Brooks & Kushman P.C.

(57) ABSTRACT

A system and method is provided for treating engine exhaust gases produced by an internal combustion engine. The internal combustion engine has an exhaust gas recirculation circuit which diverts engine exhaust gas from an engine exhaust gas manifold to an engine air intake manifold. An exhaust gas recirculation valve is further provided for controlling the amount of engine exhaust gas diverted toward the engine air intake manifold. Additionally, a small meter pump is provided to create a pressure differential sufficient to introduce a finely tunable and controllable amount of engine exhaust gas into the engine air intake manifold.

9 Claims, 3 Drawing Sheets

U.S. PATENT DOCUMENTS

| | | |
|---|---|---|
| 5,685,519 A | 11/1997 | Bircann et al. |
| 5,690,081 A | 11/1997 | Kwiatkowski |
| 5,704,340 A | 1/1998 | Togai |
| 5,732,688 A | 3/1998 | Charlton et al. |
| 5,740,785 A | 4/1998 | Dickey et al. |
| 5,771,868 A | 6/1998 | Khair |
| 5,791,146 A * | 8/1998 | Dungner .................... 60/605.2 |
| 5,794,445 A | 8/1998 | Dungner |
| 5,802,846 A | 9/1998 | Bailey |
| 5,836,155 A | 11/1998 | Katoh |
| 5,927,075 A | 7/1999 | Khair |
| 5,937,650 A * | 8/1999 | Arnold ...................... 60/605.2 |
| 5,957,116 A | 9/1999 | Haegle et al. |
| 5,974,802 A * | 11/1999 | Blake ........................ 60/605.2 |
| 5,987,882 A | 11/1999 | Voss et al. |
| 6,009,709 A | 1/2000 | Bailey |
| 6,009,851 A | 1/2000 | Iida et al. |
| 6,012,431 A | 1/2000 | Itoyama et al. |
| 6,012,437 A | 1/2000 | Radhamohan et al. |
| 6,014,959 A | 1/2000 | Ma |
| 6,014,961 A | 1/2000 | Gates |
| 6,026,790 A | 2/2000 | Itoyama |
| 6,038,860 A | 3/2000 | Bailey |
| 6,039,560 A | 3/2000 | Kubota |
| 6,041,602 A * | 3/2000 | Dickey ...................... 60/605.2 |
| 6,042,505 A | 3/2000 | Bellinger |
| 6,044,827 A | 4/2000 | Pfaff et al. |
| 6,055,811 A | 5/2000 | Maddock et al. |
| 6,055,965 A | 5/2000 | Amstutz et al. |
| 6,058,626 A | 5/2000 | De Vroome et al. |
| 6,062,026 A | 5/2000 | Woollenweber et al. |
| 6,067,800 A | 5/2000 | Kolmanovsky et al. |
| 6,076,353 A | 6/2000 | Freudenberg et al. |
| 6,079,395 A | 6/2000 | Coleman |
| 6,164,071 A * | 12/2000 | Shao et al. ................ 60/605.2 |
| 6,216,460 B1 * | 4/2001 | Shao et al. ................ 60/605.2 |
| 6,216,461 B1 * | 4/2001 | Shao et al. ................ 60/605.2 |
| 6,237,335 B1 * | 5/2001 | Lonnqvist ................. 60/605.2 |

* cited by examiner

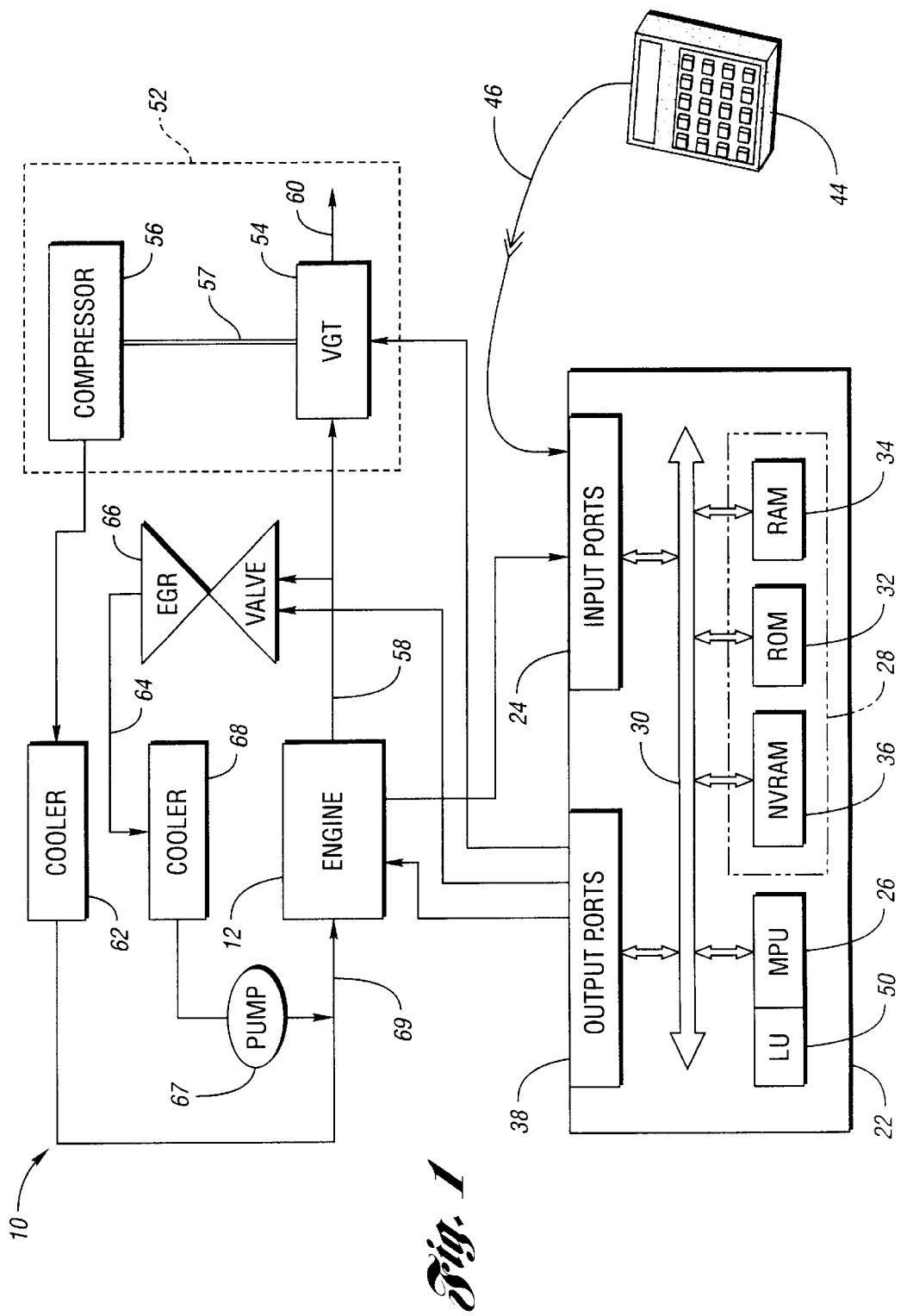

ELECTRONIC CONTROLLED ENGINE EXHAUST TREATMENT SYSTEM TO REDUCE NO$_X$ EMISSIONS

TECHNICAL FIELD

The present invention relates to systems and methods for controlling harmful exhaust gas emissions produced by an internal combustion engine using an exhaust gas recirculation circuit.

BACKGROUND ART

The use of alternative charge air handling and turbocharging concepts to drive and control exhaust gas recirculation (EGR) as a primary means for reducing harmful exhaust emissions in automotive and truck engines is in widespread use today. One of the more popular approaches is to use a single stage variable geometry turbocharger (VGT) in combination with an EGR circuit to achieve the desired ratio of EGR rate and fresh air/fuel ratio. Typically, the EGR circuit at a minimum, includes a EGR valve, a cooler, tubing connecting the exhaust side of the engine with the intake side of the engine. The EGR valve may be an on/off or a modulating type to regulate EGR flow and it may be mounted on the turbine, exhaust manifold, or on the downstream cool side of the EGR cooler. Alternatively, the EGR circuit may include a mixing device at the point of the EGR gas entry into the intake and/or venturi device to encourage a negative pressure differential across the engine as required to drive EGR flow from the exhaust side to the intake side of the engine.

In many diesel engines, particularly large engines under low speed and moderate to high load operation, the turbocharger match is relatively efficient. Therefore, intake side pressure levels will usually exceed exhaust side pressure and a positive pressure differential exists across the engine under a wide range of steady state or near steady state operating conditions. However, to drive EGR from the exhaust to the intake side of the engine, a negative pressure differential must be created for all or part of the engine cycle. In some exhaust gas treatment systems, the VGT forms the primary role of reversing the pressure differential across the engine. However, during the breathing portion of the four stroke cycle, engine pumping parasitics and brake specific fuel consumption (BSFC) are increased. As the turbine vanes are moved toward a closed position, turbocharger compressor wheel speeds increase as does overall boost levels. Depending on the contour of the turbine and compressor efficiency maps versus gas flow and boost, turbine and compressor efficiencies will eventually begin to deteriorate as the wheel speeds and boost increase. Turbine-in pressure (engine exhaust pressure) will ultimately exceed compressor out pressure (engine intake pressure) thereby creating the necessary overall negative pressure differential across the engine. Manifold gas dynamics and associated pressure pulses will enable some amount of EGR to begin to flow even though the cycle average pressure differential across the engine is slightly positive. If moderate to large EGR flow rate percentages are required, the cycle average pressure differential will become negative.

One challenge for a production feasible diesel engine EGR system is the repeatable control of EGR and fresh air/fuel ratios under all modes of normal and regulated operation and over the life of the engine. Depending on the turborcharger-engine match and gas dynamic characteristics of a given engine/EGR system, EGR flow rates can be highly sensitive to geometry of the VGT/EGR circuit. It is not unusual for EGR flow rates and BSFC to be increasingly sensitive to the geometry and position of the VGT vanes, as local turbine gas velocities increase, especially under high load/low speed operation. Tolerance stackups of VGT and EGR circuit hardware can yield an imposing challenge to achieve equal EGR rates from engine to engine, even when the engine is new. As parts begin to wear and accumulate normal levels of residue, the flow characteristics of the EGR circuit are affected. The ability to manage the appropriate ratio of EGR flow and fresh engine air flow via control logic for controlling the VGT circuit and the EGR valve becomes increasingly difficult.

Therefore, a need exists for a new and improved system for managing the appropriate ratio of EGR circuit flow and fresh engine air flow. The new and improved system must compensate for tolerance stackups of the VGT and EGR circuit hardware.

DISCLOSURE OF INVENTION

In accordance with an aspect of the present invention, an exhaust gas treatment system for use in an internal combustion engine for treating exhaust gases, wherein the internal combustion engine has an engine exhaust gas manifold and an engine air intake manifold is provided. The exhaust gas treatment system has an exhaust gas recirculation valve in communication with the engine exhaust gas manifold and engine air intake manifold. The valve directs engine exhaust gas toward the engine air intake manifold. Further, a pump is disposed between the engine air intake manifold and the exhaust gas recirculation valve to create a pressure differential to facilitate the exhaust gas to flow from the engine exhaust gas manifold to the engine air intake manifold.

In accordance with another aspect of the present invention, a cooler is disposed between the pump and the exhaust gas recirculation valve for cooling the engine exhaust gases before the exhaust gases reach the engine air intake manifold.

In accordance with still another aspect of the present invention, a gas turbine circuit is provided for supplying charged air to the engine air intake manifold.

In accordance with still another aspect of the present invention, the gas turbine circuit further comprises a gas turbine and a compressor.

In accordance with still another aspect of the present invention, the gas turbine is a variable geometry turbine.

In accordance with still another aspect of the present invention, the pump is a small meter pump.

In accordance with yet another aspect of the present invention, the EGR valve is an on/off valve.

In accordance with yet another aspect of the present invention, the EGR valve is a modulating valve.

In accordance with yet another aspect of the present invention, the pump is disposed between the cooler and the engine air intake manifold.

In accordance with yet another aspect of the present invention, the pump is capable of providing real-time measurement of exhaust gas recirculation flow rates.

In accordance with yet another aspect of the present invention the pump has a pressure range of between 0 to 0.2 bar.

In accordance with yet another aspect of the present invention a method is provided for treating engine exhaust gases produced by an internal combustion engine. The internal combustion engine has an exhaust gas recirculation circuit which diverts engine exhaust gas from an engine exhaust gas manifold to an engine air intake manifold. The method includes diverting the engine exhaust gases toward the engine air intake manifold using an exhaust gas recirculation valve and creating a pressure differential for enabling the engine exhaust gas to flow from the engine exhaust gas manifold to the engine air intake manifold using a pump disposed between the engine air intake manifold and the exhaust gas recirculation valve.

The above features, benefits and advantages and other features, benefits and advantages of the present invention are readily apparent from the following detailed description of the best mode for carrying out the invention when taken together with the accompanying drawings.

BRIEF DESCRIPTION OF DRAWINGS

FIG. 1 is a schematic diagram of an internal combustion engine and engine control system, in accordance with the present invention.

BEST MODE FOR CARRYING OUT THE INVENTION

Figure 2A:
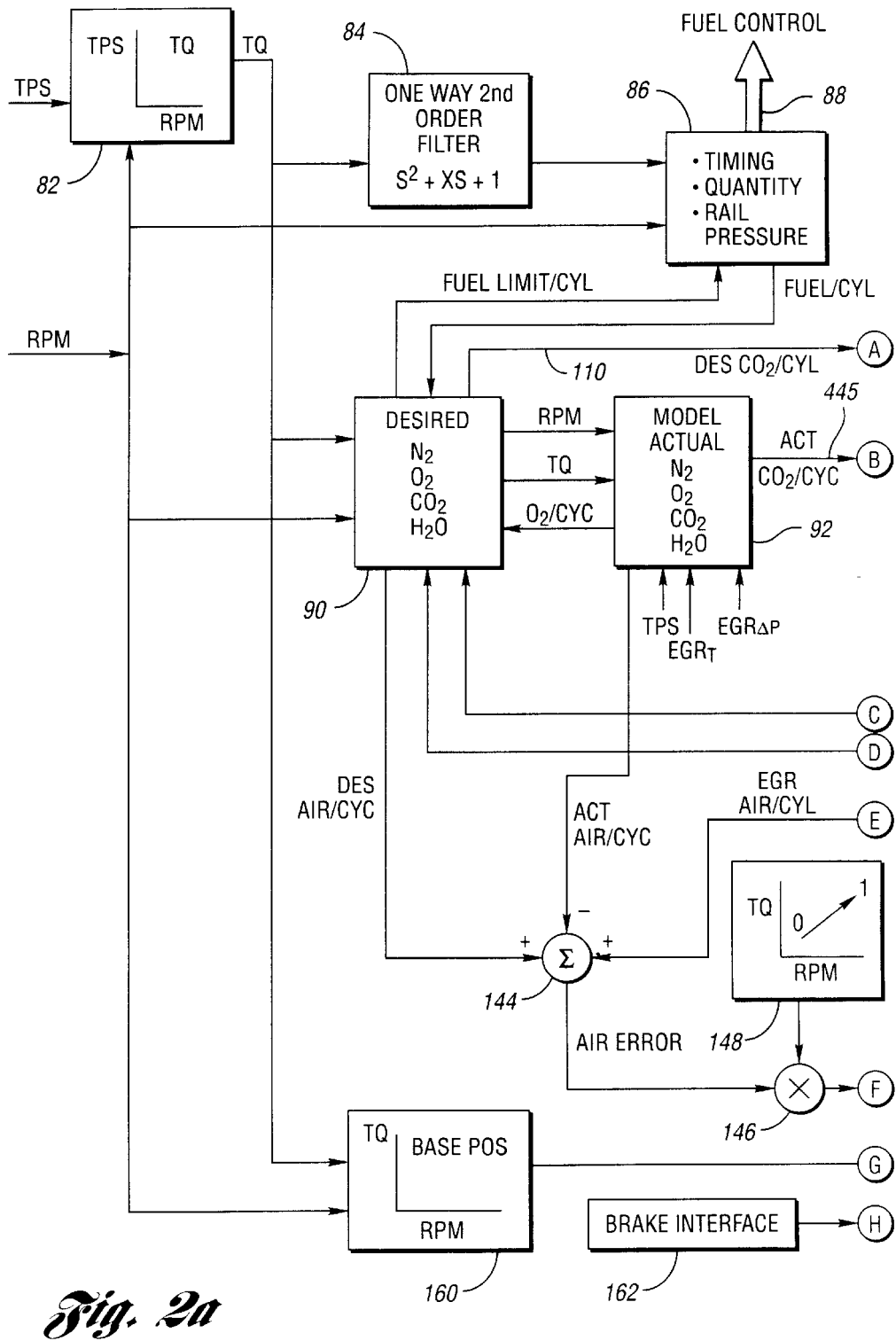
FIG. 2 is a block diagram depicting control logic for controlling the EGR and VGT circuits, in accordance with the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel fuel engine. The injectors receive pressurized fuel from a fuel supply in a known manner.

Various sensors are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 has instructions stored thereon that are executable by controller 22 to perform methods of controlling the internal combustion engine, including an exhaust gas recirculation (EGR) valve 66 and variable geometry turbocharger 52. The program instructions direct controller 22 to control the various systems and subsystems of the vehicle, with the instructions being executed by microprocessor 26, and optionally, instructions may also be executed by any number of logic units 50. Input ports 24 receive signals from various sensors, and controller 22 generates signals at output ports 38 that are directed to the various vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various vehicle sensors and executes control logic embedded in hardware and/or software to control the engine. In a preferred embodiment, controller 22 is the DDEC controller available from Detroit Diesel Corporation, Detroit, Mich. Various other features of this controller are described in detail in a number of different U.S. patents assigned to Detroit Diesel Corporation.

As is appreciated by one of ordinary skill in the art, control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategy may be used to control an engine in accordance with the present invention.

Further, it is to be appreciated that the engine controller may receive information in a variety of ways. For example, engine systems information could be received over a data link, at a digital input or at a sensor input of the engine controller.

With continuing reference to FIG. 1, controller 22 provides enhanced engine performance by controlling exhaust gas recirculation valve 66, a variable geometry turbocharger 52 and a small meter-pump 67. Variable geometry turbocharger 52 includes a turbine 54 and a compressor 56. The pressure of the engine exhaust gasses causes the turbine to spin. The turbine drives the compressor, which is typically mounted on the same shaft 57. The spinning compressor creates turbo boost pressure which develops increased power during combustion.

A variable geometry turbocharger has moveable components in addition to the rotor group. These moveable components can change the turbocharger geometry by changing the area or areas in the turbine stage through which exhaust gasses from the engine flow, and/or changing the angle at which the exhaust gasses enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the air flow is choked down to the desired level. There are several designs for the variable geometry turbocharger. In one design, a variable inlet nozzle has a cascade of moveable vanes which are pivotable to change the area and angle at which the air flow enters the turbine wheel. In another design, the turbocharger has a moveable side wall which varies the effective cross-sectional area of the turbine housing. It is appreciated that embodiments of the present invention are not limited to any particular structure for the variable geometry turbocharger. That is, the term VGT as used herein means any controllable air pressurizing device including the above examples, and including a modulated waste gate valve.

An exhaust gas recirculation system introduces a metered portion of the exhaust gasses into the intake manifold 69. The EGR system dilutes the incoming fresh air charge and lowers combustion temperatures to reduce the level of oxides of nitrogen. The amount of exhaust gas to be recirculated is controlled by EGR valve 66 and VGT 52.

In accordance with an embodiment of the present invention, the EGR valve is a variable flow valve that is electronically controlled by controller 22. The geometry of the variable geometry turbocharger is also electronically controlled by controller 22. It is appreciated that there are many possible configurations for a controllable EGR valve, and embodiments of the present invention are not limited to any particular structure for the EGR valve. Further, it is appreciated that various sensors at the EGR valve may detect temperature and differential pressure to allow the engine control to determine the mass flow rate through the valve. In addition, it is appreciated that various different sensor configurations may be utilized in various parts of the exhaust flow paths to allow controller 22 to determine the various mass flow rates throughout the exhaust system, including flow through the EGR system and flow through the compressor, and any other flows.

In another embodiment of the present invention the EGR valve is a simple on/off valve with no modulating capabilities. In this embodiment pump 67 is sufficient to introduce the desired amount of EGR flow commanded by controller 22.

In some embodiments, it may be desirable to provide a cooler 62 to cool the charge air coming from compressor 56. Similarly, in some embodiments, it may be desirable to provide a cooler 68 to cool the flow through the EGR system prior to reintroduction into engine 12.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. In a preferred embodiment of the present invention, the various techniques utilized to determine the EGR and VGT command signals are best shown in FIG. 2.

In a preferred embodiment of the present invention, small meter pump 67 is positioned between cooler 68 and intake manifold 69 of engine 12. Pump 67 is a positive displaced pump for driving a regulated amount of exhaust gas from engine exhaust manifold 58 to intake manifold 69. Pump 67 provides a means for incrementally increasing the negative pressure differential across engine 12. Moreover, desired quantities of exhaust gas may be accurately metered by pump 67, relieving VGT 52 of high resolution control. Further, pump 67 allows for real-time measurement of EGR flow rates in combination with on-board algorithmic calculations. Thus, the present invention, eliminates the need for additional EGR measurement devices currently used in prior art EGR circuits.

In operation, pump 67 would assume primary control of EGR flow rates from the VGT, when the VGT vanes are properly positioned and stabilized, for a given engine operating condition whereby the onset of EGR flow is imminent, (mean engine pressure differential approaches zero) and the balance of fresh air/fuel ratio is adequate. Preferably, the pressure range of pump 67 would be limited to between 0 and 0.2 bars. Full flow range capacity of the pump 67 would generally, be in the order of 25% or less of total engine flow (on a mass basis). However, generally the required control flow range of pump 67 under most steady or quasi-steady state operating conditions of engine 12 would be approximately 10% of the total engine mass flow. Pump 67 is configured to survive in abrasive and acidic engine exhaust environments at pressures of 2–4 bars and temperatures of up to 300° C.

Figure 2B:
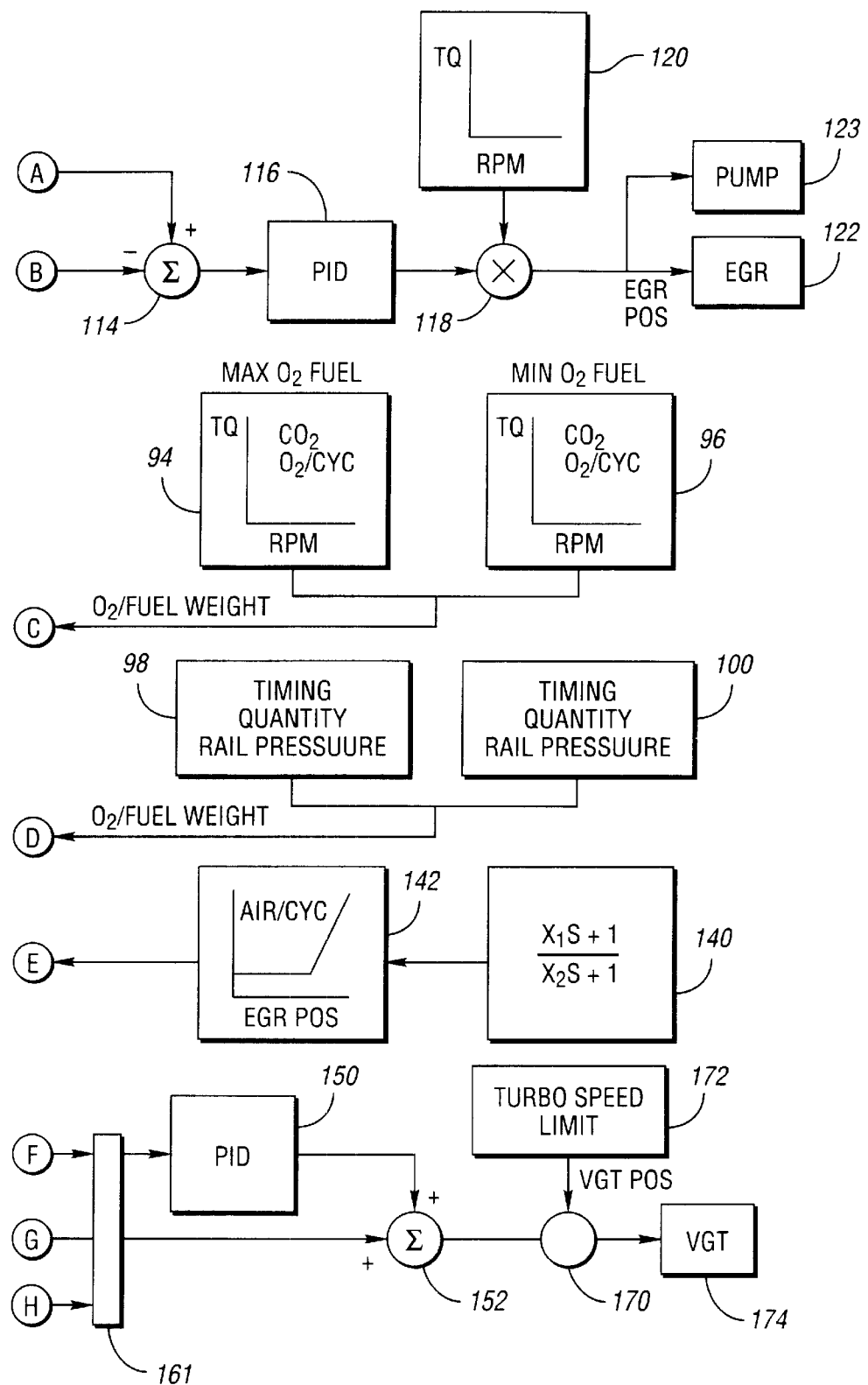

In FIG. 2, a block diagram 80 illustrates the functions of the control logic, including instructions, executed by controller 22 to provide enhanced engine performance and improved emission control. Embodiments of the present invention are particularly useful to improve emissions on heavy-duty diesel engines. Using EGR technology to mix a portion of exhaust gas with the intake charge reduces emissions of oxides of nitrogen ($NO_x$), while minimizing fuel economy impact and improving durability, in accordance with the present invention. In a turbo charged diesel engine, the back pressure necessary to drive the EGR flow from exhaust to intake manifold is accomplished with the variable geometry turbocharger and pump 67. The control of the EGR flow rate may be achieved by changing the geometry of the VGT (for example, vane position change), by changing the EGR valve position, by controlling pump 67 output and preferably via a combination of all three. In preferred embodiments, the method of control employed results in interactions between EGR and VGT systems that are beyond the capabilities of existing systems.

There are many aspects of the present invention that may be used separately or together. In the preferred embodiment, the EGR valve, pump and the VGT are controlled simultaneously and continuously. That is, preferred embodiments provide continuously adjusting an EGR/VGT/pump controller. Preferred implementations of the present invention utilize desired intake manifold composition in terms of chemical species ($O_2$, $N_2$, $CO_2$ and $H_2O$) as a set point for the controller. The actual quantity of these chemical species is preferably calculated from a simplified combustion model.

With continuing reference to FIG. 2, in the embodiment illustrated, a driver accelerator position sensor input and an engine speed (rpm) input are received at block 82. Block 82 utilizes a look up table to determine an engine torque demand. The engine torque demand represents a fuel quantity that may be adjusted for other aspects of engine control that are not specifically described herein such as, for example, cylinder balancing. Further, it is appreciated that FIG. 2 illustrates a preferred implementation and that various aspects of the control strategy shown are preferred, but not specifically required. At block 84, a one way, second order filter adds some delay to the torque demand. Delay is added to allow the slower, air flow aspects of engine control to catch up to the faster responding fuel delivery aspects of engine control. At block 86, engine speed and torque demand are received, and processed along with other engine conditions, resulting in desired fuel injection timing, quantity, and rail pressure. These factors control fuel delivery, indicated at 88.

At block 90, a desired chemical composition for the engine air intake is determined. The desired composition is in terms of chemical species ($N_2$, $O_2$, $CO_2$, and $H_2O$). The fuel per cycle is provided to block 90 from injection control block 86, and block 90 provides a fuel limit per cycle to block 86 (for example, fuel may be limited in low air flow conditions). At block 92, actual flow values for the EGR system and turbo charging system, the oxygen to fuel ratio, and chemical composition of the intake gasses are calculated. The calculations are based on a simplified combustion model and engine sensor inputs. The desired or set point values in block 90 are based on interpolation of values contained within five pairs of look up tables. The first table (94,98) corresponds to stabilized turbocharger boost pressure and the second table (96,100) corresponds to minimum allowable turbocharger boost pressure. That is, the first table corresponds to maximum oxygen per fuel (per cycle) while the second table corresponds to minimum, allowable oxygen per fuel, for a given torque demand. Depending on the current oxygen per fuel as determined from various measurements, desired values are interpolated between the two tables for the particular value.

For example, desired carbon dioxide and air values are determined using interpolation between tables 94,96 (block 94 and block 96 each represent two look up tables, one table for $CO_2$ and one table for oxygen quantity/cycle, for a total of four tables). Similarly, desired values for timing parameters, quantity, and rail pressure are determined by interpolation (based on oxygen per fuel) between tables 98 and 100 (block 98 and block 100 each represent three tables). In accordance with preferred embodiments of the present invention, controller 22 adjusts VGT, EGR valve, and pump rate to achieve the desired values at block 90 (that are calculated by interpolation) within the respective minimum/maximum tables (96,100 and 94,98, respectively).

Further at block 90, a desired carbon dioxide quantity 110 is determined. From block 92, an actual carbon dioxide quantity is estimated. It is appreciated that the quantities are preferably represented as mass per cycle. Summer 114 compares the desired carbon dioxide quantity 110 to the actual carbon dioxide quantity 112 to determine the carbon dioxide error signal. EGR valve 122 and pump 67 are controlled by an EGR pump command signal based on the error signal. Preferably, a controller, such as a proportional/integral/derivative controller 116 (or preferably with a non linear compensation term, for example, a Smith predictor) adjusts the EGR valve position and pump flow rate to achieve a desired EGR rate and desired carbon dioxide quantity. Further, in preferred embodiments, EGR loop gain normalization is contained within block 120 to improve transient response by reducing the effects of rapid changes in torque demand.

After loop gain normalization, the resultant EGR pump command signal is supplied by controller 22 (FIG. 1) to EGR valve 122 and pump 67. Preferably, the EGR pump command signal is also passed to the VGT control, as described below.

In controlling VGT 174, a base geometry (vane position in the preferred implementation), is determined at block 160 based on torque demand and engine speed. The commanded base position is passed from block 160 to block 161. At block 162, a brake interface allows engine braking control logic to override a commanded base position by the normal VGT logic in the event that the engine is being operated as an engine brake. Engine braking uses the engine as a compressor to dissipate lower amounts of energy over a longer amount of time, as opposed to normal vehicle brakes that dissipate a large amount of energy for a shorter amount of time.

The base geometry block 160 serves as a feedforward feature for VGT control to improve transient response and also enable open loop control when desired as described further below.

The EGR pump command signal is received by lead compensation logic 140 to determine a lead compensated signal based on the EGR pump command signal. In embodiments of the present invention, this portion of the control loop synchronizes simultaneous EGR valve, pump and VGT geometry control. Particularly, when EGR valve and pump control are not sufficient to achieve desired EGR rate, the VGT geometry is modified to increase air flow through the turbine until the desired EGR flow is achieved. Moreover, when EGR valve control and VGT geometry control is not sufficient to achieve the desired EGR rate, pump 67 metering is modified to increase EGR circuit back pressure. The lead term 140 improves transient response to compensate for the turbo boost lag. That is, when EGR valve control, VGT geometry control and pump control are not sufficient to achieve desired carbon dioxide content in the engine intake, increased flow through the turbine increases the overall air flow, but the turbine becomes less efficient, increasing the back pressure that drives carbon dioxide containing exhaust gasses through the recirculation path, resultingly increasing the carbon dioxide mass per cycle at the intake.

At block 142, additional compensation terms based on EGR valve position and pump metering rate modifies the lead compensator output. As shown, summer 144 receives a desired air per cycle signal and a actual air per cycle signal to determine an air error. Lead compensator 140 and additional compensator 142 anticipate and exaggerate the air error when it is expected that the EGR valve is opening. The air error determined at block 144 and/or the base geometry (for example vane position) as determined at block 160 are used to determine the VGT command signal.

Preferably, at block 148, normalization values contained within block 148 linearize the loop gain of PID controller 150, and serve as a variable switch between open and closed loop control approaches. That is, at low air flow conditions (low engine speed and low torque demand), the normalization factor reduces the air error to zero or to a sufficiently low value so as to be effectively insignificant in controlling VGT 174. That is, at low air flow conditions, normalization effectively eliminates the air error signal leaving the base geometry (the feedforward term) to control the VGT in an open loop fashion. On the other hand, once air flow reaches a sufficient level, the gain normalization factor jumps from zero to a sufficiently greater value to control VGT 174 and linearize PID controller 150. As air flow continues to increase, the normalization factor decreases because at higher air flows, PID controller 150 is more effective. The gain normalization term is zero at low air flows. Air flow is preferably determined as a function of torque demand and engine speed. Once significant air flow exists, the gain normalization term is significantly increased to change from effectively pure open loop control of the VGT with the feedforward term to closed loop control of the VGT (with the feedforward term). As air flow continues to increase, the gain normalization term is reduced.

As shown by summer 152, the base vane position (or other suitable geometry indicator depending on the implementation) from block 160 provides the general control of the VGT command signal, while the signal derived from the air error provides fine tuning (except at low air flow conditions where the air error portion is effectively ignored and open loop control used). Coming out of the summer 152, limiter 170 limits the VGT command signal as needed to prevent turbo overspeeding. For example, at higher altitudes, continued demands for more oxygen may result in a turbo overspeed. This situation is prevented by turbo speed limit at block 172. After limiting, if necessary, the VGT command signal is applied to VGT 174. As explained above, the EGR command signal is utilized (with lead compensation) to adjust an air error signal to provide fine tuning of the VGT command signal. As such, continuous, simultaneous control of both the EGR and VGT systems allow the effects of these systems on each other to be taken into account during the control strategy. Lead term 140 improves transient response. Accordingly, the control loop also works in the opposite direction, adjusting the EGR valve position, VGT and pump metering rate if a desired boost (or air/fuel ratio) is not achieved. That means, at tables 94,96, at lower oxygen per fuel, the value in the minimum $CO_2$ table commands a desired carbon dioxide quantity of zero. The upper $CO_2$ table is desired $CO_2$ quantity at an upper oxygen per fuel ratio. The lower $CO_2$ defines a lower oxygen per fuel ratio at which desired $CO_2$ is zero. That is, when the engine is already running fuel rich, tables 94 and 96 are interpolated such that desired carbon dioxide quantity is zero. As such, the function used to interpolate between the two carbon dioxide tables may be significantly different than the function used to interpolate between the two air quantity tables. Further, it is appreciated that the interpolation between any two tables is not limited to linear interpolation, but may take other forms.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An exhaust gas treatment system for use in an internal combustion engine for treating engine exhaust gases, the internal combustion engine having an engine exhaust gas manifold and an engine air intake manifold, the exhaust gas treatment system comprising:

an exhaust gas recirculation valve in communication with the engine exhaust gas manifold and engine air intake manifold for directing engine exhaust gas toward the engine air intake manifold;

a small metering pump disposed between the engine air intake manifold and the exhaust gas recirculation valve for creating a pressure differential of between 0 and 0.2 bar to facilitate exhaust gas flow from the engine exhaust gas manifold to the engine air intake manifold, the small metering pump providing measurement of exhaust gas recirculation flow;

a cooler disposed downstream of the exhaust gas recirculation valve for cooling the engine exhaust gases before the exhaust gases reach the engine air intake manifold;

a variable geometry turbocharger having a turbine powered by the exhaust gas and a compressor for increasing pressure of intake air;

an engine control module in communication with the exhaust gas recirculation valve, the small metering pump, and the variable geometry turbocharger, the control module determining a desired EGR flow and controlling the exhaust gas recirculation valve, the small metering pump, and the variable geometry turbocharger such that actual EGR flow approaches the desired EGR flow.

2. The exhaust gas treatment system of claim 1 wherein the EGR valve is an on/off valve.

3. The exhaust gas treatment system of claim 1 wherein the EGR valve is a modulating valve.

4. The exhaust gas treatment system of claim 1 wherein the pump is disposed between the cooler and the engine air inlet.

5. The exhaust gas treatment system of claim 1 wherein the pump is capable of providing real-time measurement of exhaust gas recirculation flow rates.

6. The system of claim 1 wherein the small metering pump has a full flow capacity of less than about 25 percent of total engine flow on a mass basis.

7. The system of claim 1 wherein the engine control module determines a desired EGR flow based on a desired air intake composition of predetermined chemical species.

8. The system of claim 7 wherein the chemical species comprise oxygen, nitrogen, carbon dioxide, and water.

9. The system of claim 1 wherein the desired EGR flow and the actual EGR flow correspond to mass flow values.

* * * * *